US012630096B2

(12) United States Patent
Hannigan

(10) Patent No.: US 12,630,096 B2
(45) Date of Patent: May 19, 2026

(54) LIFT FOR HITCH-MOUNTED CARGO CARRIER

(71) Applicant: Innovex Group Ltd., Edmonton (CA)

(72) Inventor: Sean Hannigan, Edmonton (CA)

(73) Assignee: Innovex Group Ltd., Edmonton (CA)

( * ) Notice: Subject to any disclaimer, the term of this patent is extended or adjusted under 35 U.S.C. 154(b) by 0 days.

(21) Appl. No.: 18/421,838

(22) Filed: Jan. 24, 2024

(65) Prior Publication Data

US 2024/0246492 A1     Jul. 25, 2024

Related U.S. Application Data

(60) Provisional application No. 63/440,870, filed on Jan. 24, 2023.

(51) Int. Cl.
B60R 9/06 (2006.01)
B66F 3/10 (2006.01)

(52) U.S. Cl.
CPC . B60R 9/06 (2013.01); B66F 3/10 (2013.01)

(58) Field of Classification Search
CPC .... B60R 9/06; B66F 3/10; B60D 1/46; B60D 1/465
USPC ................................ 414/462; 212/180, 490.1
See application file for complete search history.

(56) References Cited

U.S. PATENT DOCUMENTS

| | | | | | |
|---|---|---|---|---|---|
| 4,695,218 | A | * | 9/1987 | Boyer | B60R 9/06 |
| | | | | | 224/524 |
| 4,741,660 | A | * | 5/1988 | Kent | A61G 3/0209 |
| | | | | | 414/622 |
| 5,560,628 | A | * | 10/1996 | Horn | B60P 3/125 |
| | | | | | 280/490.1 |
| 5,567,107 | A | * | 10/1996 | Bruno | B60R 9/06 |
| | | | | | 241/DIG. 38 |
| 5,984,613 | A | * | 11/1999 | Motilewa | B60R 9/06 |
| | | | | | 224/521 |
| 6,129,371 | A | * | 10/2000 | Powell | B60R 9/06 |
| | | | | | 280/491.5 |
| 6,293,451 | B1 | * | 9/2001 | LeMay | B60R 9/065 |
| | | | | | 224/523 |
| 6,663,133 | B1 | * | 12/2003 | Rosenlund | B60D 1/06 |
| | | | | | 280/490.1 |
| 7,370,844 | B2 | * | 5/2008 | McGriff | B60D 1/07 |
| | | | | | 254/419 |
| 8,235,644 | B2 | * | 8/2012 | DiGiovanni | A61G 3/06 |
| | | | | | 414/921 |
| 9,216,698 | B2 | * | 12/2015 | Rhodes | B60R 9/065 |

(Continued)

*Primary Examiner* — Gregory W Adams
(74) *Attorney, Agent, or Firm* — Nathan V. Woodruff

(57) ABSTRACT

A lift for a hitch mounted cargo carrier has a linear actuator having fixed and moveable portion. A drive extends and retracts the moveable portion relative to the fixed portion along an axis of the linear actuator. A hitch mount is secured relative to the fixed portion that is sized to be received by a hitch receiver of a vehicle such that the axis is vertically oriented and the moveable portion extends from a bottom end of the fixed portion. A moveable hitch receiver is secured to a bottom end of the moveable portion, the moveable hitch receiver being positioned such that the receiver traverses the axis. The hitch mount and the moveable hitch receiver extend substantially perpendicularly to the axis and the hitch mount extends substantially anti-parallel to the moveable hitch receiver and on an opposite side of the linear actuator.

17 Claims, 8 Drawing Sheets

(56)     References Cited

U.S. PATENT DOCUMENTS

| | | | | |
|---|---|---|---|---|
| 9,233,634 | B1 * | 1/2016 | Level | B60P 3/077 |
| 10,232,792 | B2 * | 3/2019 | Egan | B60R 9/06 |
| 10,266,123 | B1 * | 4/2019 | Faynor | B60R 9/06 |
| 10,576,799 | B1 * | 3/2020 | O'Connell | B60D 1/46 |
| 10,668,866 | B2 * | 6/2020 | Kuschmeader | B60R 9/10 |
| 10,773,561 | B2 * | 9/2020 | Apland | B60D 1/46 |
| 11,007,919 | B2 * | 5/2021 | Nash | B60R 9/06 |
| 2013/0142602 | A1 * | 6/2013 | Barnts | B60P 1/4421 |
| | | | | 414/462 |
| 2015/0050107 | A1 * | 2/2015 | Kipp | B60P 3/07 |
| | | | | 414/462 |
| 2018/0244209 | A1 * | 8/2018 | Hebel | B60R 9/06 |
| 2019/0135060 | A1 * | 5/2019 | Frisz | B60D 1/58 |
| 2020/0189481 | A1 * | 6/2020 | Doelitsch | B60R 9/10 |
| 2021/0101427 | A1 * | 4/2021 | Ayoub | B60D 1/187 |
| 2021/0316582 | A1 * | 10/2021 | Patterson | B60S 9/04 |
| 2024/0208429 | A1 * | 6/2024 | Whited, Jr. | B60R 9/06 |

* cited by examiner

1

LIFT FOR HITCH-MOUNTED CARGO CARRIER

TECHNICAL FIELD

This relates to hitch-mounted cargo carriers, and in particular, a lift for hitch-mounted cargo carriers.

BACKGROUND

Cargo carriers are often mounted to hitch-receivers of passenger vehicles, such as hitch-mounted bike racks, hard-shell containers, and the like. U.S. Pat. No. 6,293,451 (LeMay et al.) entitled "Vehicle hitch mounted cargo carrier" describes a cargo carrier that extends outward to allow a rear hatch of a vehicle to open. U.S. Pat. No. 10,668,666 (Kuschmeader et al.) entitled "Hitch-mounted bicycle carrier" describes a bicycle carrier that pivots outward to allow a rear hatch of a vehicle to open.

SUMMARY

According to an aspect, there is provided a lift for a hitch mounted cargo carrier. The lift may comprise a linear actuator comprising a fixed portion and a moveable portion, the linear actuator comprising a drive that drives the linear actuator such that the moveable portion selectively extends and retracts relative to the fixed portion along an axis of the linear actuator. A hitch mount is secured relative to the fixed portion, the hitch mount being sized to be received by a hitch receiver of a vehicle such that, when installed, the linear actuator is upright and the moveable portion extends from a bottom end of the fixed portion. A moveable hitch receiver is secured to a bottom end of the moveable portion, the moveable hitch receiver being positioned such that the receiver traverses the axis. The hitch mount and the moveable hitch receiver extend substantially perpendicularly to the axis and the hitch mount extends substantially anti-parallel to the moveable hitch receiver and on an opposite side of the linear actuator.

According to other aspects, the lift may include one or more of the following aspects, alone or in combination: the drive may comprise a manual crank, an electric drive, or both a manual crank and an electric drive; there may be an electrical connector that is adapted to connect to a hitch power outlet of the vehicle; there may be a battery removably secured relative to the electric drive that powers the electric drive; the fixed portion may be a housing and the moveable portion may be an extension received within the housing; the linear actuator may comprise an elongate support structurally attached to the hitch mount and more than one point along the fixed portion; there may be a releasable connection that selectively connects between the hitch mount and the moveable hitch receiver when the linear actuator is in a retracted position; there may be a releasable pivoting connection between the linear actuator and the hitch mount that, when released, permits the linear actuator to pivot relative to the hitch mount; there may be a pivoting connection between the linear actuator and the hitch mount, the pivoting connection having a pivot axis that is substantially parallel to the axis of the hitch mount and perpendicular to the axis of the linear actuator; and in an unloaded state, an angle between the axis of the linear actuator and the axis of the hitch mount may be between 75 and 85 degrees.

According to an aspect, there is provided a method of transporting cargo on a vehicle, comprising:

providing a lift that comprises a linear actuator comprising a fixed portion and a moveable portion that moves along an axis of the linear actuator; a hitch mount secured relative to the fixed portion; a moveable hitch receiver secured to a bottom end of the moveable portion, the moveable hitch receiver being positioned such that the receiver traverses the axis, the hitch mount and the moveable hitch receiver extending substantially perpendicularly to the axis, and the hitch mount extending substantially anti-parallel to the moveable hitch receiver and on an opposite side of the linear actuator;

installing the hitch mount in the hitch receiver of the vehicle such that the linear actuator is upright and the moveable portion extends from a bottom end of the fixed portion;

mounting a cargo carrier to the lift by installing a cargo carrier hitch mount in the moveable hitch receiver;

actuating the linear actuator move the cargo carrier between an extended position and a raised position, wherein cargo is loaded and unloaded with the cargo carrier in the extended position and cargo is transported in the raised position; and loading the cargo carrier with cargo.

According to other aspects, the method may include one or more of the following aspects, alone or in combination: actuating the linear actuator may comprise using a manual crank, an electric drive, or both a manual crank and an electric drive; an electrical connector may be connected to a hitch power outlet of the vehicle; the fixed portion may be a housing and the moveable portion may be an extension received within the housing; the linear actuator may comprise an elongate support structurally attached to the hitch mount and more than one point along the fixed portion; the method may further comprise the step of securing a releasable connection that connects between the hitch mount and the moveable hitch receiver when the linear actuator is in a retracted position; the method may further comprise the step of releasing a pivoting connection to permit pivotal movement of the linear actuator relative to the hitch mount, and securing the pivoting connection to lock the linear actuator in an upright position; in an unloaded state, an angle between the axis of the linear actuator and the axis of the hitch mount may be between 75 and 85 degrees.

According to other aspects, the features describe above may be combined in any appropriate combination.

BRIEF DESCRIPTION OF THE DRAWINGS

Features of the apparatus and method are described in the following description in which reference is made to the appended drawings, the drawings are for the purposes of illustration only and are not intended to be in any way limiting, wherein.

DETAILED DESCRIPTION OF PREFERRED EMBODIMENTS

Figure 5:
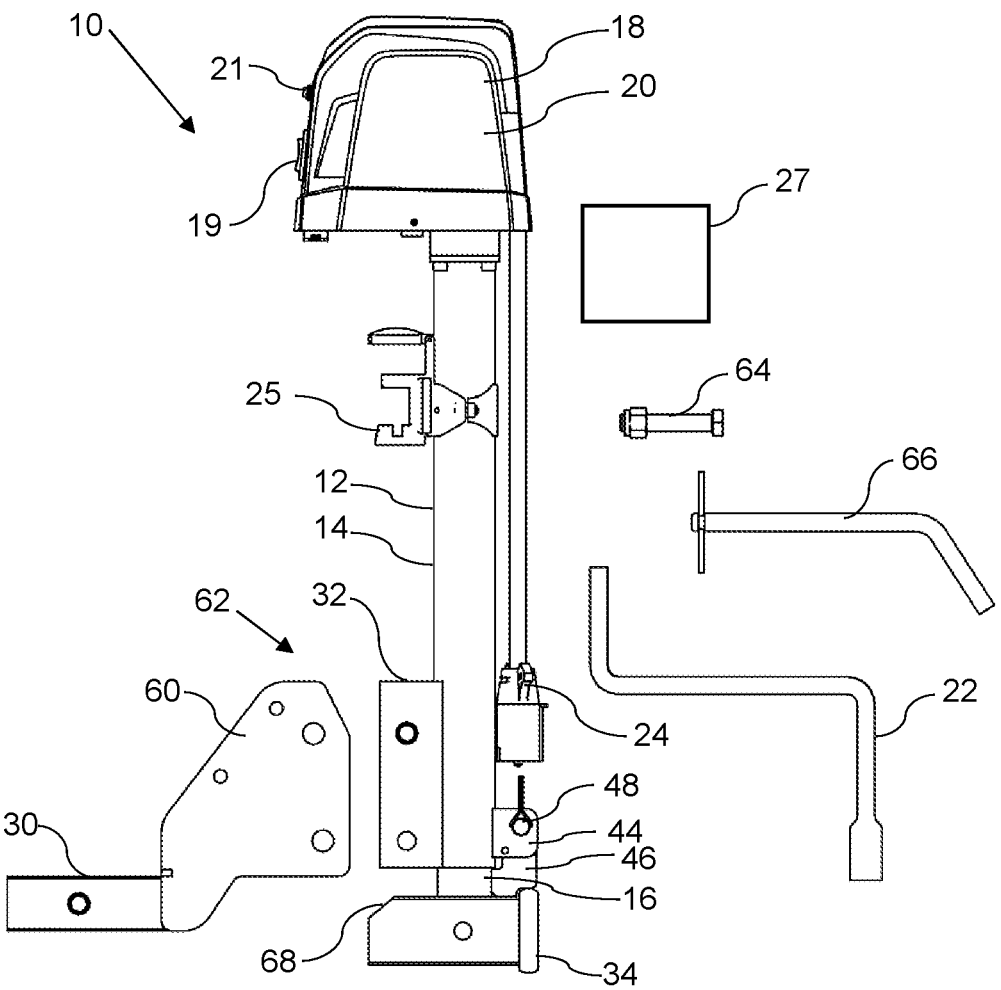
FIG. 5 is an exploded view of the lift.
Figure 6:
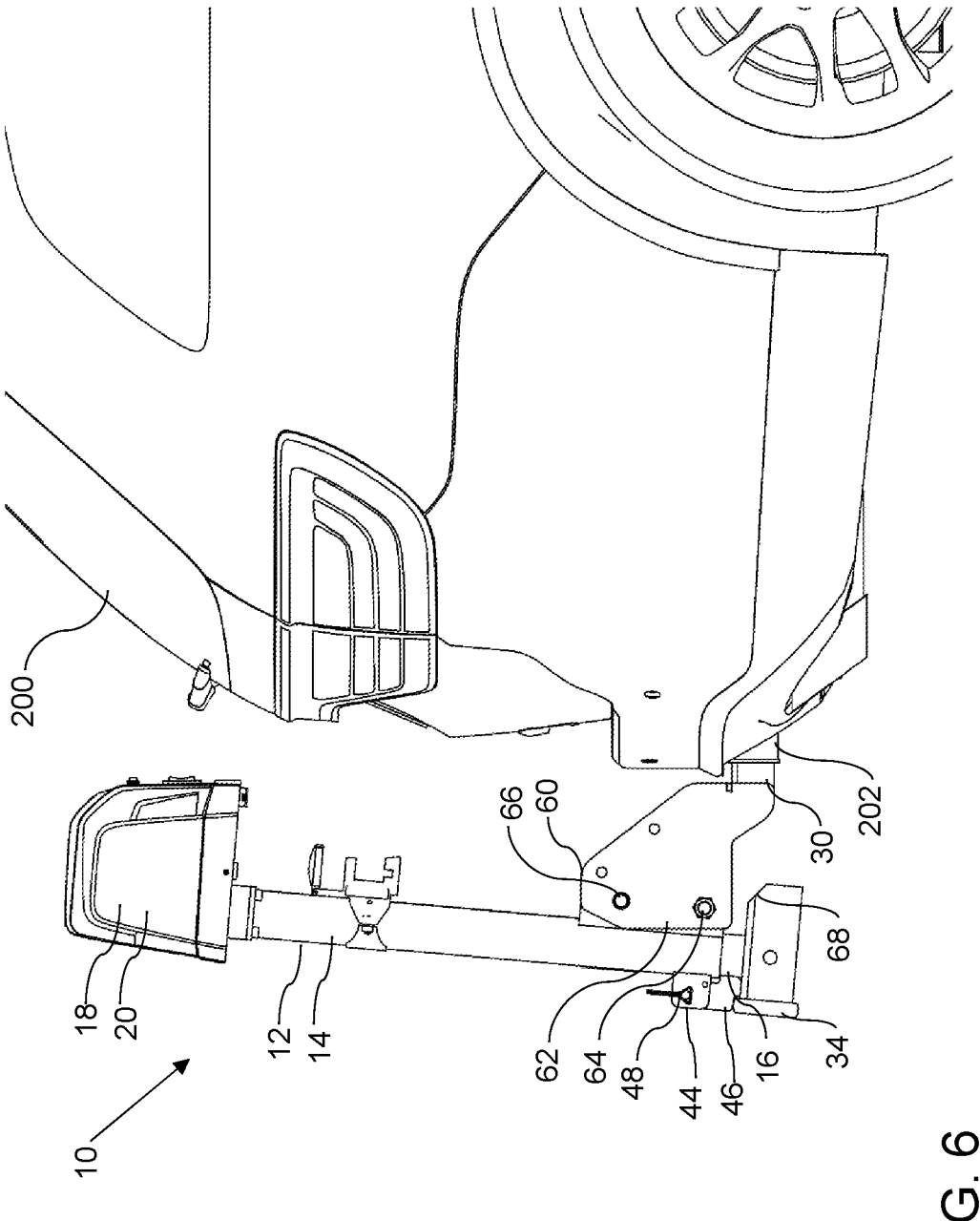
FIG. 6 is a side elevation view of the lift mounted on a vehicle in the raised position.
Figure 7:
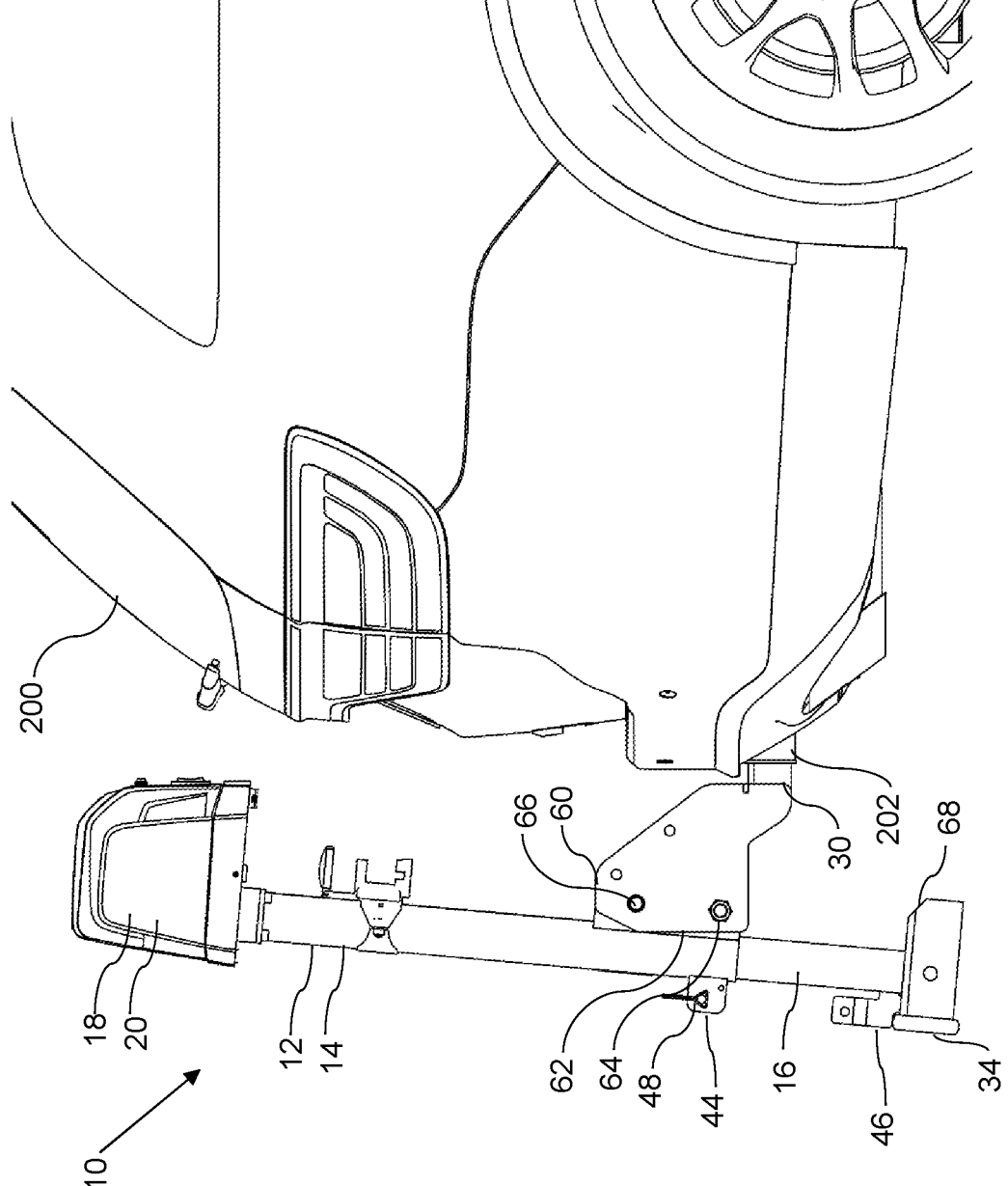
FIG. 7 is a side elevation view of the lift mounted on a vehicle in the lowered position.

A lift for a hitch-mounted cargo carrier, generally identified by reference number 10, will now be described with reference to FIG. 1 through 10. Referring to FIG. 6, lift 10 may be used as an intermediate connection between a hitch-mounted cargo carrier 100 and a vehicle 200 that has a hitch receiver 202 and allows hitch-mounted cargo carrier 100 to be raised and lowered, such as to facilitate loading and unloading cargo from hitch-mounted cargo carrier 100.

Figure 2:
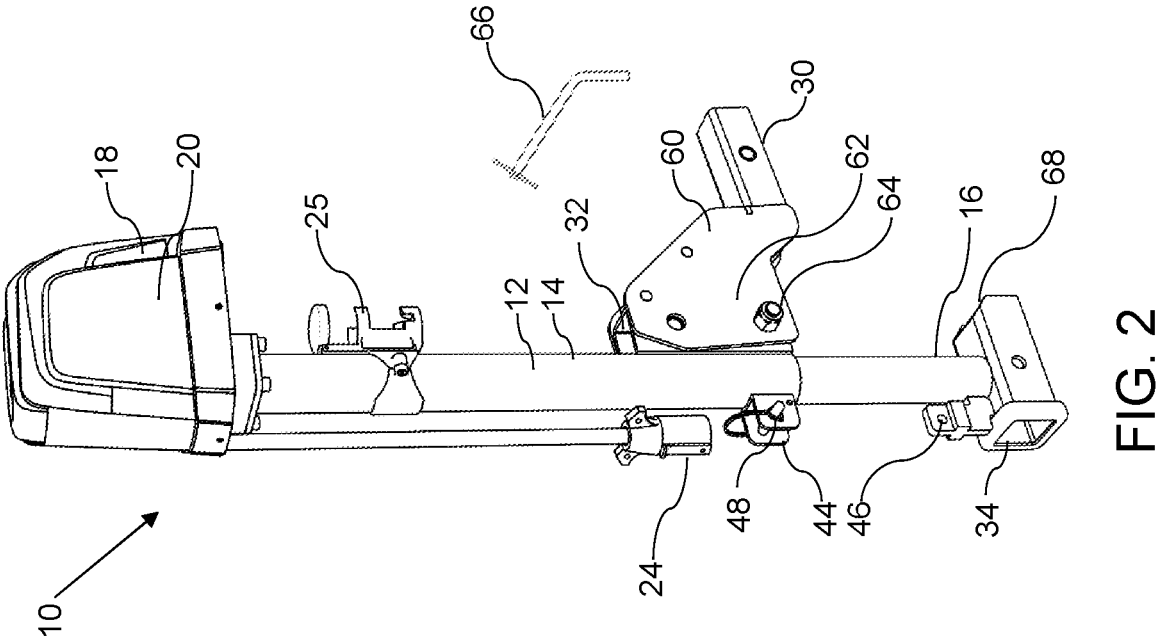
FIG. 2 is a front perspective view of the lift in the lowered position.
Figure 1:
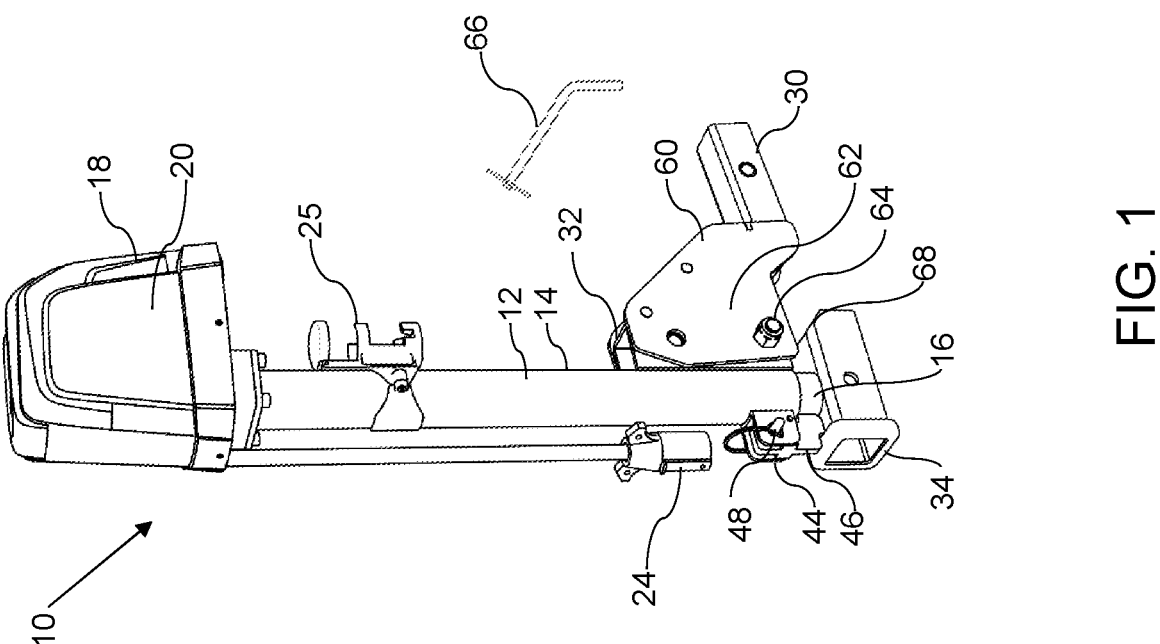
FIG. 1 is a front perspective view of a lift in the raised position.
Figure 4:
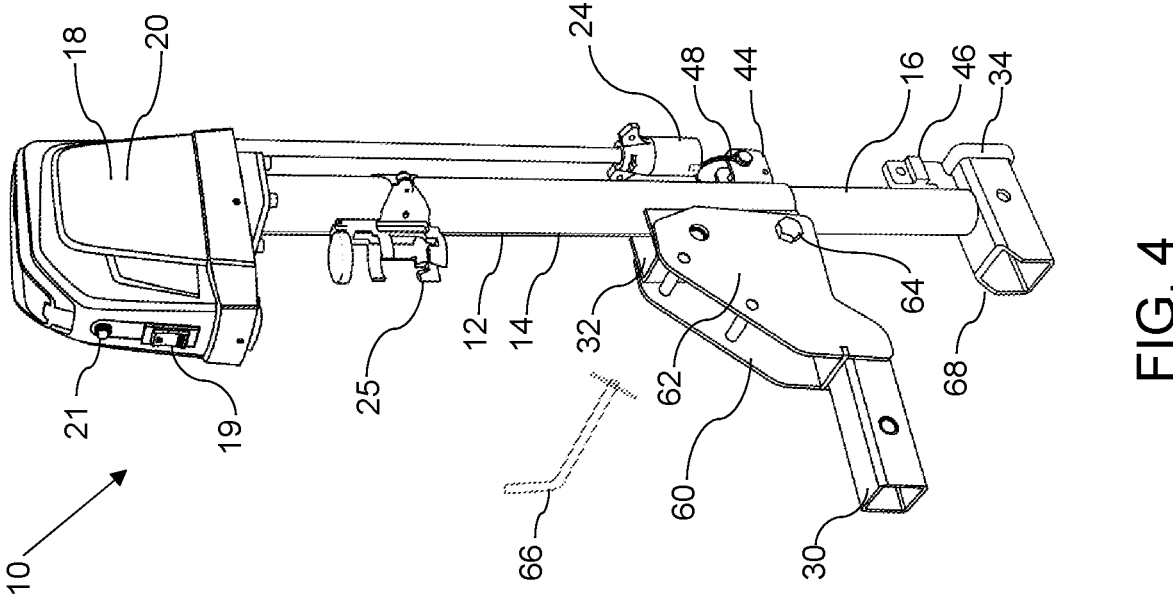
FIG. 4 is a rear perspective view of the lift in the lowered position.

Referring to FIGS. 1 and 2, lift 10 has a linear actuator 12 with a fixed portion 14 and a movable portion 16 that moves relative to fixed portion 14. In the depicted example, fixed portion 14 is an outer tube that acts as a housing and movable portion 16 is an extendable member such as an inner tube. In other examples, fixed portion 14 may be an inner tube that is in a fixed position and movable portion 16 may be a shroud, such as an outer tube that moves relative to fixed portion 14. Linear actuator 12 has a drive 18 that drives movable portion 16 relative to fixed portion 14 along an axis between an extended position shown in FIGS. 2 and 4 and a retracted position shown in FIGS. 1 and 3. Linear actuator 12 may be any suitable type of actuator, such as a threaded nut that rotates to cause a threaded rod to extend and retract. Linear actuator may be a hydraulic cylinder, in which case drive 18 may be a hydraulic pump.

In the depicted example, drive 18 has an electric motor 20 that is powered via an electric power source. Referring to FIG. 5, drive may also be powered manually by a crank 22 that selectively engages a drive port (not shown) of drive 18. If drive 18 is only powered manually, crank 22 may be mounted permanently, such as with a hinge (not shown) to allow it to move to a storage position. As depicted, drive 18 may have an electrical connector 24 that is sized to connect to a hitch power outlet of vehicle 200 to connect motor 20 to the electrical system of a vehicle. Linear actuator 12 may carry a holder 25 for electrical connector 24, so that it may be placed out of the way or protected when useful to do so. Electrical connector 24 may have a standard configuration or be connectable to an adapter that connects to an electrical socket of vehicles equipped with such a connector, such as vehicles a tow package or the like. This allows lift 10 to be more easily mounted and removed from vehicle 200 relative to, for example, a hard-wired electrical connection. Drive 18 may also be provided with a battery 27, which may permit drive 18 to be operated when the vehicle is not running. If battery 27 is used, drive 18 may still be electrically connected to vehicle 200 so that it is charged by the vehicle's electrical system. Alternatively, battery 27 may be removeable so that it may be charged and replaced. In many cases, an electrically powered drive will be most convenient as it can be driven by the vehicle's electrical system. A manual drive, such as crank 22, may also be used to drive linear actuator 12. In some cases, where drive 18 is electrically driven, a remote control (not shown) may be used to drive linear actuator, allowing a user to be safely distanced from linear actuator 12 and a cargo carrier 100 during operation. As shown, drive 18 may include an operating switch 19 that controls linear actuator 12. Drive 18 may also include a light switch 21 that turns on a work light (not shown).

As shown, lift 10 has both an electric motor 20 and a crank 22. Manual crank 22 may be included as a part of drive 18 along with electric motor 20 so that linear actuator 12 may be driven in the absence of electrical power, or for other reasons. Other drives or power sources may also be used, however providing the electric and/or manual drives at the top of linear actuator 12 provide a convenient location that is accessible once lift 10 has been installed on a vehicle 200. In some implementations, lift 10 may be powered by either motor 20 or crank 22 alone.

Figure 3:
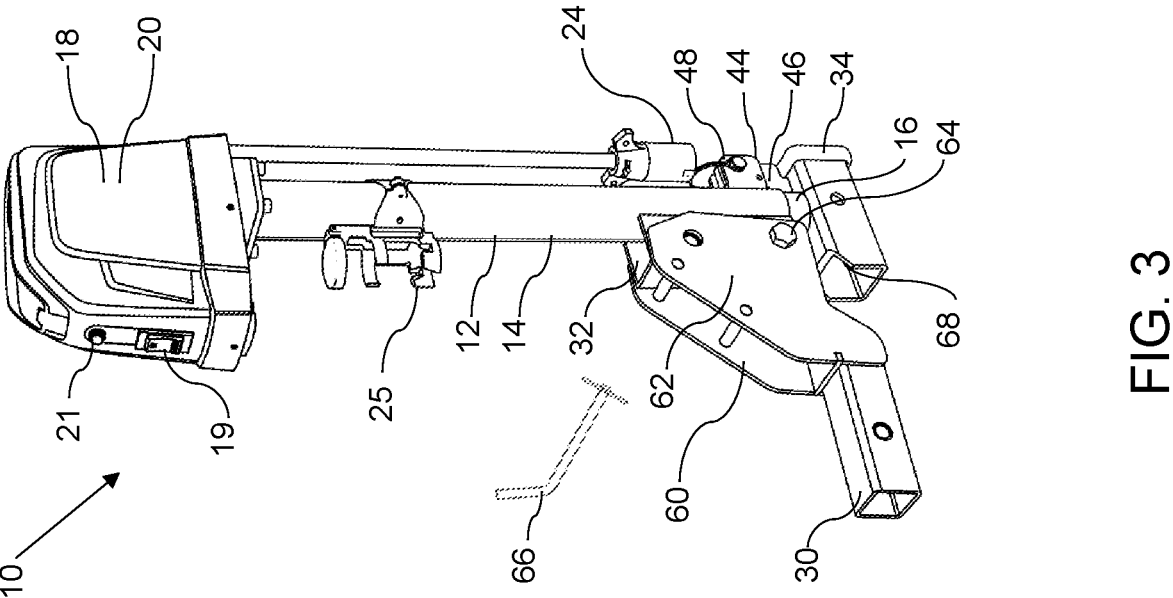
FIG. 3 is a rear perspective view of a lift in the raised position.

Referring to FIG. 3, lift 10 has a hitch mount 30 that is secured relative to fixed portion 14 of linear actuator 12, and is sized to be received by a hitch receiver 202 of vehicle 200, such that, as shown in FIG. 6, linear actuator 12 is upright relative to the ground surface, or in other words, substantially vertical. In this orientation, movable portion 16 extends from a bottom end of fixed portion 14. Hitch mount 30 may be a standard sized based on the size of hitch receiver 202 of vehicle 200, and/or may be adaptable to different sizes in accordance with common practice for hitches and hitch receivers. A support member 32 may be attached to hitch mount 30 and fixed portion 14 along a portion of the length of fixed portion 14 to provide structural support to lift 10. In one example, support member 32 may be metal tube that works with a corner brace 60 to provide additional support to linear actuator 12 against deformation.

Figure 10:
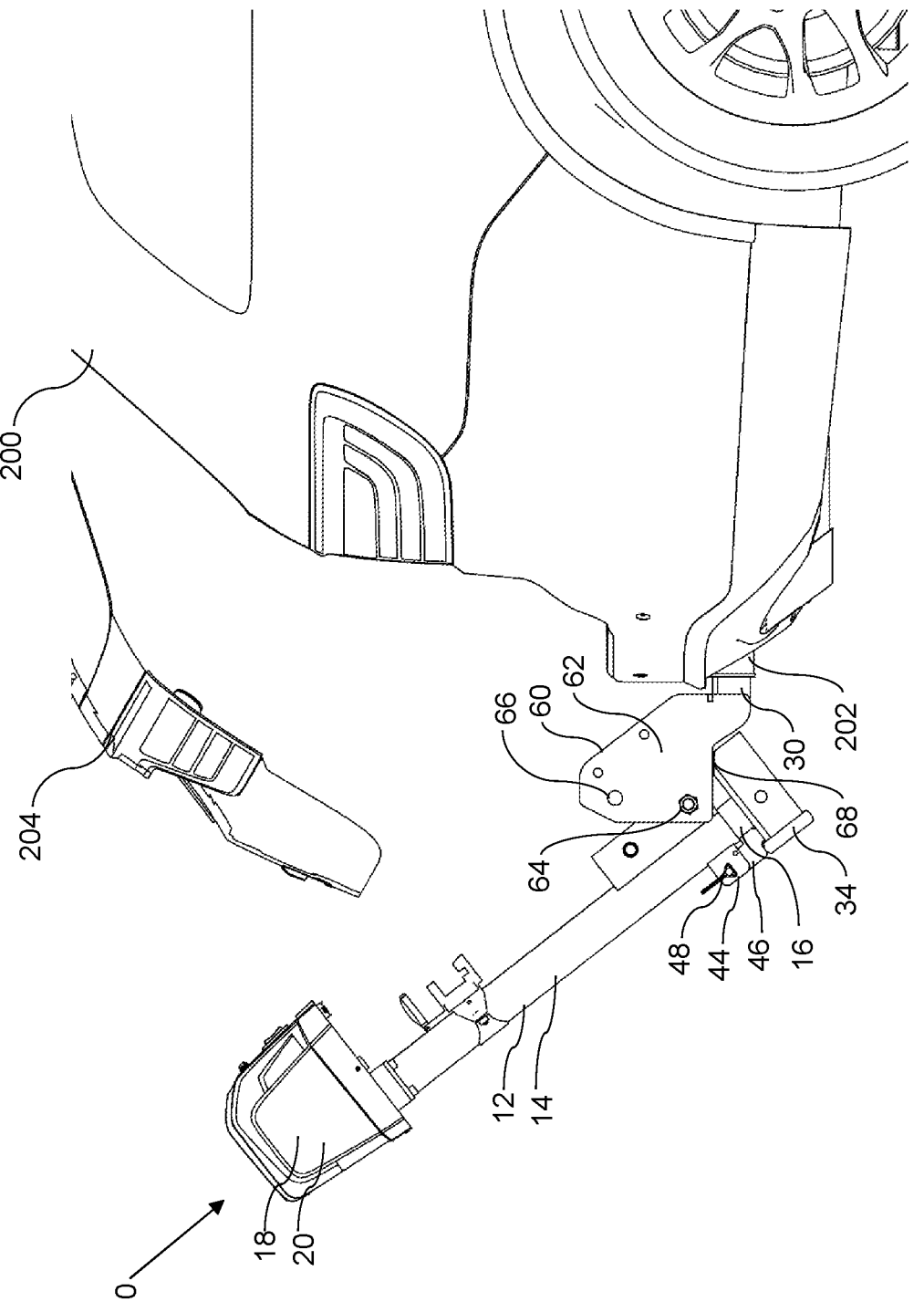
FIG. 10 is a side elevation view of the lift mounted on the vehicle in a pivoted position.

Referring to FIG. 6, linear actuator 12 may be connected to hitch mount 30 using a pivoting connection 62, which may be integrated as part of corner brace 60, and which allows linear actuator 12 to pivot away from vehicle 200 and provide access, such as to allow a rear hatch 204 of vehicle 200 to open. Pivoting connection 62 includes a pivot bolt 64 and a removable locking bolt 66, which allows linear actuator 12 to pivot away from hitch mount 30 when removed, as shown in FIG. 10. Movable hitch receiver 34 may include a rotational stop 68 that engages hitch mount 30 to prevent over-rotation. In other examples, pivoting connection 62 may have an axis that is parallel to the axis of hitch mount 30 (not shown). In that example, rather than rotating away from hitch mount 30 and vehicle 200, linear actuator is permitted to rotate clockwise and/or counterclockwise.

Figure 8:
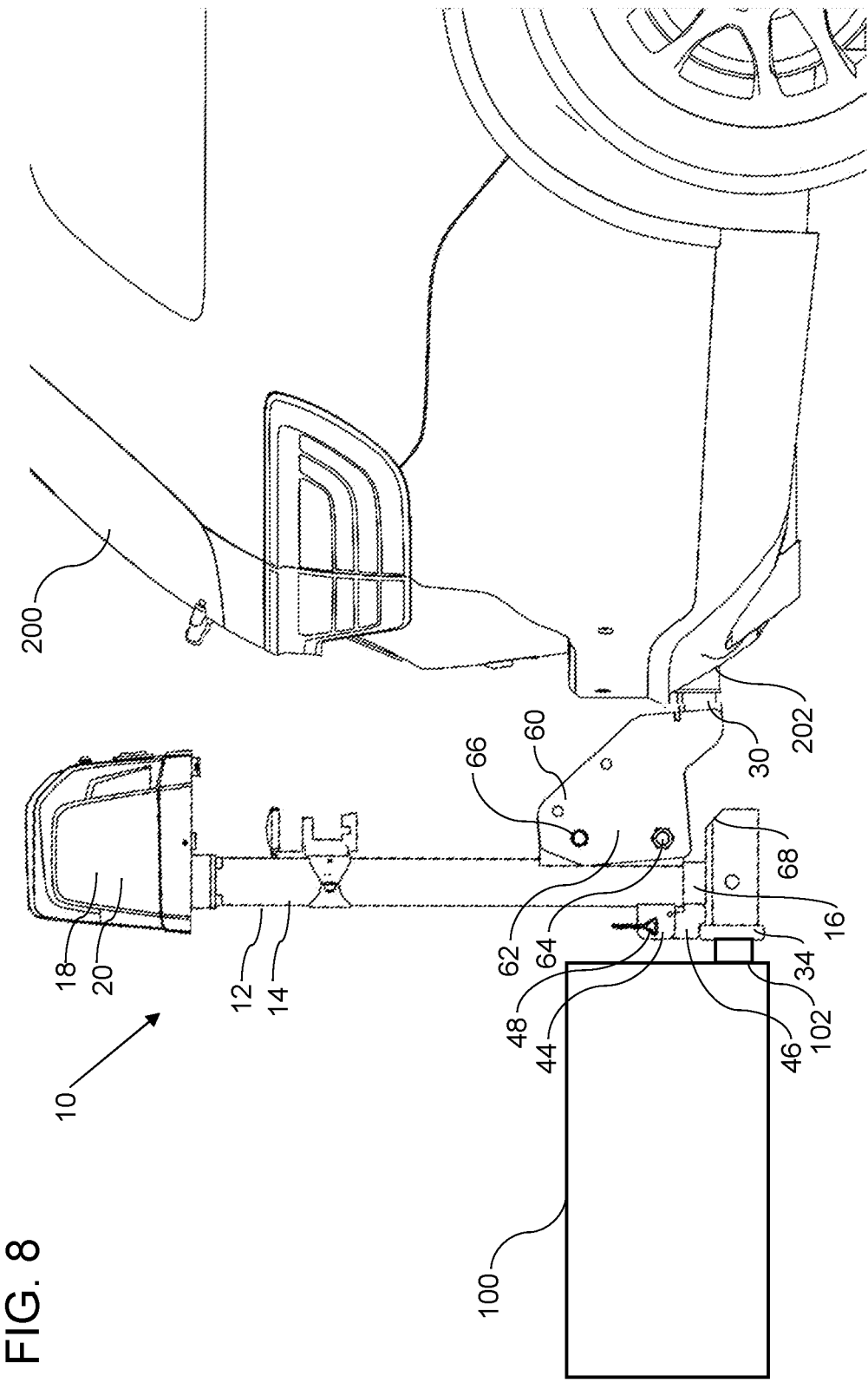
FIG. 8 is a side elevation view of the lift mounted on the vehicle carrying a cargo carrier in the raised position.

Referring to FIG. 2, the inner tube of movable portion 16 is received within the outer tube of fixed portion 14 such that moveable portion 16 is driven up and down when drive 18 is actuated. Referring to FIG. 8, movable hitch receiver 34, carried by moveable portion 16, allows a cargo carrier 100 to be mounted thereto. Preferably, movable hitch receiver 34 is a standard size that is intended to receive a hitch mount 102 of a standard cargo carrier 100, such that lift 10 acts as an intermediate component in mounting cargo carrier 100, while allowing cargo carrier 100 to be mounted in the same manner it would otherwise. Movable hitch receiver 34 may be permanently affixed, or may be removable (not shown), which allows movable hitch receiver 34 to be replaced by different hitch component to match the intended hitch mount of cargo carrier 100. Movable hitch receiver 34 is positioned such that receiver 34 intersects the axis of linear actuator 12, which is intended to be upright, or in other words, oriented vertically or substantially vertical when installed on vehicle 200.

Referring to FIG. 8, movable hitch receiver 34 and linear actuator 12 may be designed to improve balance and weight displacement during operation. In some cases, this may be improved by providing linear actuator 12 at an angle that is less than 90 degrees relative to hitch mount 30, such as an angle of 75, 80, or 85 degrees, or any suitable angle therebetween. In this manner, the pivoting movement of movable hitch receiver 34 may be accounted for. The pivoting movement may occur as a result of the resilience of the components in lift 10, the play between connected components, the compression of the suspension (not shown) of vehicle 200, etc. As a result, linear actuator 12 may be substantially vertical such that, when loaded, the load is applied directly below linear actuator 12. In this manner, when a load is applied to movable hitch receiver 34, the weight of the load may be transferred to linear actuator 12 directly under elongate support member 32. In addition, cargo carrier 100 will be substantially parallel to the ground, or at least at an angle that is sufficient to avoid interference with the ground as the vehicle is being operation. In this context, "substantially" means within about 5 degrees and so that linear actuator 12 is closer to a vertical orientation than would otherwise be the case when loaded.

Referring to FIG. 5, moveable hitch receiver 34 and fixed portion 14 of linear actuator 12 may have mating components 44 and 46 that engage when movable hitch receiver 34 is in the retracted position. Mating components 44 and 46 may be designed to be locked by a locking pin 48 to selectively secure movable hitch receiver 34 in the raised position to improve safety during operation of vehicle 200. Pin 48 may also be used to transfer the load directly from movable hitch receiver 34 to fixed portion 14 to reduce the load applied to the movable portion 16 of linear actuator 12.

Referring to FIG. 1 through 4, hitch mount 30 and movable hitch receiver 34 both extend perpendicularly to the axis, or substantially perpendicular subject to the discussion above. Hitch mount 30 extends in a direction that is anti parallel to movable hitch receiver 34 and on an opposite side of linear actuator 12. That is, movable hitch receiver 34 extends in a direction away from the direction that hitch mount 30 extends, such that movable hitch receiver 34 extends in the same direction and, in the raised position, in a vertical position that approximates the vertical position of hitch receiver 202 of vehicle 200.

Figure 9:
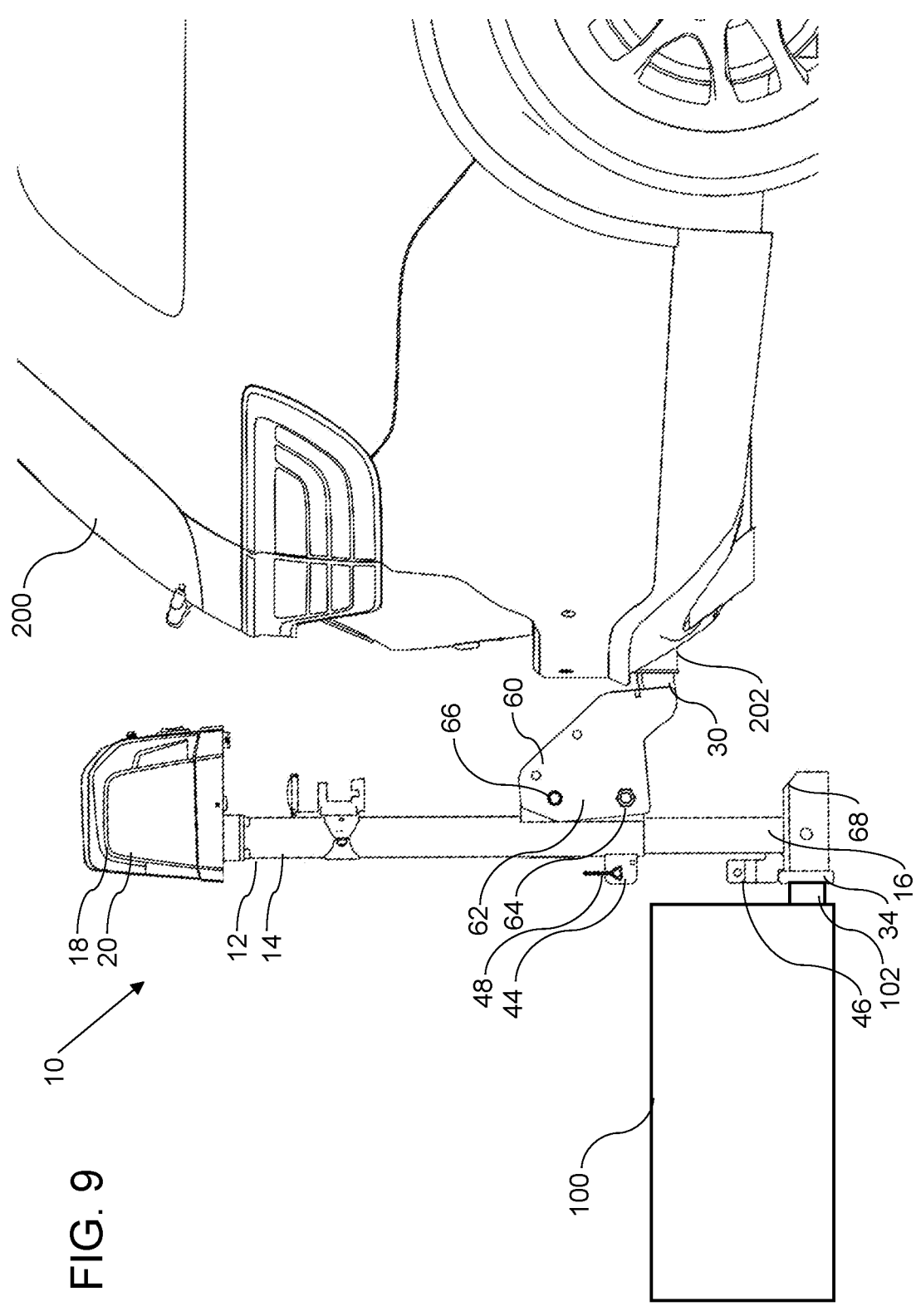
FIG. 9 is a side elevation view of the lift mounted on the vehicle carrying a cargo carrier in the raised position.

A method of loading a cargo using the lift as described above will now be described. Referring to FIG. 6, hitch mount of the lift is installed into the hitch receiver of a vehicle. Referring to FIG. 8, cargo carrier 100 is mounted to the lift by installing hitch mount 102 of cargo carrier 100 in movable hitch receiver 34. This may be done with linear actuator 12 in the extended or retracted position, as convenient. It will be understood that the extended state may be reached at different distances travelled, as required by a particular intended use of lift 10. Typically, the extended state may be a ground level. Referring to FIG. 9, with linear actuator 12 in the extended state, cargo may be loaded on and unloaded from cargo carrier 100. If cargo carrier 100 is a bike carrier, the bikes may be rolled on and rolled of. Other wheeled types of cargo may be rolled on an off of different types of cargo carriers 100. Cargo carrier 100 may be positioned at a vertical height that is suitable for loading and unloading, other than the ground level. After loading or unloading, referring to FIG. 8, linear actuator 12 may be actuated to lift movable hitch receiver 34, and cargo carrier 100 if mounted, toward the retracted position for storage or transport. Once in the retracted (or transport) position, pin 48 may be installed to engage components 44 and 46 to secure movable hitch receiver 34 relative to fixed portion 14 of linear actuator 12.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context requires that there be one and only one of the elements.

The scope of the following claims should not be limited by the preferred embodiments set forth in the examples above and in the drawings but should be given the broadest interpretation consistent with the description as a whole.

What is claimed is:

1. A lift for a hitch mounted cargo carrier comprises:
   a linear actuator comprising a fixed portion and a moveable portion, the linear actuator comprising a drive that drives the linear actuator such that the moveable portion selectively extends and retracts relative to the fixed portion along an axis of the linear actuator;
   a hitch mount secured relative to the fixed portion, the hitch mount being sized to be received by a hitch receiver of a vehicle such that, when installed, the linear actuator is upright and the moveable portion extends from a bottom end of the fixed portion;
   a releasable pivoting connection between the linear actuator and the hitch mount that, when released, permits the linear actuator to pivot relative to the hitch mount;
   a brace carried by the hitch mount, the brace securing the hitch mount to the fixed portion;
   a moveable hitch receiver secured to a bottom end of the moveable portion, the moveable hitch receiver being positioned such that the moveable hitch receiver traverses the axis; and
   a releasable connection that selectively connects between the hitch mount and the moveable hitch receiver when the linear actuator is in a retracted position, wherein the releasable connection:
      prevents the linear actuator from moving from the retracted position to the extended position when connected; and
      permits the linear actuator to move to the extended position when disconnected; and
   a pivotal stop that comprises a brace stop surface on a bottom of the brace and a receiver stop shoulder at a rear end of the moveable hitch receiver such that, with the linear actuator retracted, the pivotal stop limits the pivotal movement of the linear actuator as the linear actuator pivots in a direction that causes the moveable hitch receiver to move toward the hitch mount;
   wherein the hitch mount and the moveable hitch receiver extend substantially perpendicularly to the axis and the hitch mount extends substantially anti-parallel to the moveable hitch receiver and on an opposite side of the linear actuator.

2. The lift of claim 1, wherein the drive comprises a manual crank, an electric drive, or both a manual crank and an electric drive.

3. The lift of claim 2, further comprising an electrical connector that is adapted to connect to a hitch power outlet of the vehicle.

4. The lift of claim 2, further comprising a battery removably secured relative to the electric drive that powers the electric drive.

5. The lift of claim 1, wherein the fixed portion is a housing and the moveable portion is an extension received within the housing.

6. The lift of claim 1, wherein the linear actuator comprises an elongate support structurally attached to the hitch mount and more than one point along the fixed portion.

7. The lift of claim 1, wherein, in an unloaded, extended state, the linear actuator leans toward the hitch mount such that an angle between the axis of the linear actuator and the axis of the hitch mount is between 75 and 85 degrees, and in a loaded, retracted state, the linear actuator is substantially upright.

8. The lift of claim 1, wherein a bottom surface of the brace is recessed to define a receiving profile that receives the moveable hitch receiver when the liner actuator is in a retracted position such that at least a portion of the moveable hitch receiver is aligned with the hitch mount, and wherein the bottom surface comprising the brace stop surface.

9. A method of transporting cargo on a vehicle, comprising:

providing a lift that comprises:

a linear actuator comprising a fixed portion and a moveable portion that moves along an axis of the linear actuator;

a hitch mount secured relative to the fixed portion;

a moveable hitch receiver secured to a bottom end of the moveable portion, the moveable hitch receiver being positioned such that the receiver traverses the axis, the hitch mount and the moveable hitch receiver extending substantially perpendicularly to the axis, and the hitch mount extending substantially anti-parallel to the moveable hitch receiver and on an opposite side of the linear actuator;

a brace carried by the hitch mount, the brace securing the hitch mount to the fixed portion; and a pivotal stop that comprises a brace stop surface on a bottom of the brace and a receiver stop shoulder at a rear end of the moveable hitch receiver;

installing the hitch mount in the hitch receiver of the vehicle such that the linear actuator is upright and the moveable portion extends from a bottom end of the fixed portion;

mounting a cargo carrier to the lift by installing a cargo carrier hitch mount in the moveable hitch receiver;

actuating the linear actuator to move from an extended position to a retracted position; and securing a releasable connection that connects between the hitch mount and the moveable hitch receiver such that the releasable connection prevents the linear actuator from moving from the retracted position;

releasing a releasable pivoting connection between the linear actuator and the hitch mount and pivoting the linear actuator relative to the hitch mount in a direction that causes the moveable hitch receiver to move toward the hitch mount and until the pivotal stop engages the receiver stop shoulder;

wherein the releasable connection comprises a first part mounted directly to the moveable hitch receiver and a second part mounted directly to a bottom end of the fixed portion of the linear actuator, such that the first part is spaced from the second part with the linear actuator in the extended position, and engages the second part with the linear actuator in the retracted position.

10. The method of claim 9, wherein actuating the linear actuator comprises using a manual crank, an electric drive, or both a manual crank and an electric drive.

11. The method of claim 10, further comprising the step of connecting an electrical connector to a hitch power outlet of the vehicle.

12. The method of claim 9, wherein the fixed portion is a housing and the moveable portion is an extension received within the housing.

13. The method of claim 9, wherein the linear actuator comprises an elongate support structurally attached to the hitch mount and more than one point along the fixed portion.

14. The method of claim 9, further comprising the step of releasing a pivoting connection to permit pivotal movement of the linear actuator relative to the hitch mount, and securing the pivoting connection to lock the linear actuator in an upright position.

15. The method of claim 9, wherein, in an unloaded, retracted state, the linear actuator leans toward the hitch mount such that an angle between the axis of the linear actuator and the axis of the hitch mount is between 75 and 85 degrees, and in a loaded, retracted state, the linear actuator is substantially upright.

16. A lift for a hitch mounted cargo carrier, comprising:

a linear actuator comprising a fixed portion and a moveable portion, the linear actuator comprising a drive that drives the linear actuator such that the moveable portion selectively extends and retracts relative to the fixed portion along an axis of the linear actuator;

a hitch mount comprising a brace that secures the hitch mount to the fixed portion, the hitch mount being sized to be received by a hitch receiver of a vehicle such that, when installed, the linear actuator is upright and the moveable portion extends from a bottom end of the fixed portion;

a moveable hitch receiver secured to a bottom end of the moveable portion, the moveable hitch receiver being positioned such that the receiver traverses the axis; and a pivotal stop that comprises a brace stop surface on a bottom of the brace and a receiver stop shoulder at a rear end of the moveable hitch receiver such that, with the linear actuator retracted, the pivotal stop limits the pivotal movement of the linear actuator as the linear actuator pivots in a direction that causes the moveable hitch receiver to move toward the hitch mount;

wherein the hitch mount and the moveable hitch receiver extend substantially perpendicularly to the axis and the hitch mount extends substantially anti-parallel to the moveable hitch receiver and on an opposite side of the linear actuator.

17. The lift of claim 16, wherein a bottom surface of the brace is recessed to define a receiving profile that receives the moveable hitch receiver when the liner actuator is in a retracted position such that at least a portion of the moveable hitch receiver is aligned with the hitch mount, and wherein the bottom surface comprising the brace stop surface.

* * * * *